United States Patent
Adir et al.

(10) Patent No.: US 7,834,783 B2
(45) Date of Patent: Nov. 16, 2010

(54) CONVERTING A MASK CONSTRAINT INTO A BITSET CONSTRAINT

(75) Inventors: Allon Adir, Kiryat Tivon (IL); Ehud Aharoni, Kfar Saba (IL); Oded Margalit, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 12/198,125

(22) Filed: Aug. 26, 2008

(65) Prior Publication Data

US 2010/0052954 A1 Mar. 4, 2010

(51) Int. Cl.
*H03M 7/40* (2006.01)
(52) U.S. Cl. ............................. 341/67; 341/59; 341/65
(58) Field of Classification Search .................... 341/59
See application file for complete search history.

(56) References Cited

U.S. PATENT DOCUMENTS

| | | | |
|---|---|---|---|
| 5,710,561 A | * | 1/1998 | Schmidt et al. ............... 341/63 |
| 7,053,958 B2 | | 5/2006 | Sharma et al. |
| 7,071,851 B1 | * | 7/2006 | Blaum et al. .................. 341/59 |

OTHER PUBLICATIONS

Ziaonan Ji et al., "Mining minimal distinguishing subsequence patterns with gap constraints", Knowledge and Information Systems, 2006 Source: http://www.cs.mu.oz.au/~jbailey/papers/KIS.pdf, 25 pages.

* cited by examiner

*Primary Examiner*—Khai M Nguyen

(57) ABSTRACT

Converting a mask constraint into a bitset constraint. For example, a method of converting a mask constraint into a bitset constraint may include determining an intermediate bitset based on a variable-bit component of the mask constraint; and generating the bitset constraint based on the intermediate bitset and on a fixed-bit component of the mask constraint. Other embodiments are described and claimed.

20 Claims, 3 Drawing Sheets

US 7,834,783 B2

CONVERTING A MASK CONSTRAINT INTO A BITSET CONSTRAINT

FIELD

Some embodiments are related to the field of converting a mask constraint into a bitset constraint.

BACKGROUND

Many computer applications may perform computations involving a mask constraint. For example, many applications may involve generating one or more numbers satisfying a mask constraint, e.g., in the context of Pseudo Random Test Generators (PRTGs) for hardware verification. Hardware verification may include generating op-code instructions requiring generation of numbers that satisfy a mask constraint, for example, in order to generate machine code instructions with fixed op codes and variable operands.

Some computing systems, for example, computing systems including post-silicon PRTGs, may be required to perform computations associated with a mask constraint while consuming relatively short computation time and/or small memory space.

Some computations, which relate to a mask constraint, may be performed more efficiently with relation to a bitset constraint representing the mask constraint. For example, the implementation of the bitset constraint may enable using a single Boolean manipulating machine instruction to perform set operations, e.g., union (logical OR), intersection (logical AND), complement (logical negation), membership checking (bit check), and the like. The mask constraint may be replaced by the bitset constraint, for example, if the size of a domain, which corresponds to a set of numbers that possibly satisfy the mask constraint, does not exceed a word size of a machine or device performing the computations. For example, a 32-bit machine word-size may enable using a bitset constraint to represent a domain of the numbers 0-31.

SUMMARY

Some embodiments include, for example, devices, systems and methods of converting a mask constraint into a bitset constraint.

In some embodiments, a method of converting a mask constraint into a bitset constraint may include determining an intermediate bitset based on a variable-bit component of the mask constraint; and generating the bitset constraint based on the intermediate bitset and on a fixed-bit component of the mask constraint.

In some embodiments, determining the intermediate bitset may include assigning an initial value to the intermediate bitset; determining a number based on a non-zero Least Significant Bit (LSB) of the variable-bit component; modifying the intermediate bitset based on the number; modifying the variable-bit component based on the number; and repeating the determining, modifying the intermediate bitset, and modifying the variable-bit component, for one or more other non-zero LSBs of the variable-bit component.

In some embodiments, determining the number may include applying a bitwise AND operator to the variable-bit component and a two-complementary representation of a negative of the variable-bit component.

In some embodiments, the number is equal to two to the power of an index of the non-zero LSB.

In some embodiments, modifying the intermediate bitset may include adding to the intermediate bitset a result of a left shift of the intermediate bitset by a number of bits equal to the number.

In some embodiments, modifying the variable-bit component based on the number may include subtracting the number from the variable-bit component.

In some embodiments, determining the intermediate bitset may include selecting the intermediate bitset from a plurality of predefined bitsets based on the variable-bit component.

In some embodiments, generating the bitset constraint may include performing on the intermediate bitset a left shift by a number of bits equal to the fixed-bit component.

Some embodiments include an apparatus, which may include a converter to convert a mask constraint into a bitset constraint by determining an intermediate bitset based on a variable-bit component of the mask constraint; and generating the bitset constraint based on the intermediate bitset and on a fixed-bit component of the mask constraint.

Some embodiments include a computer program product including a computer-useable medium, which includes a computer-readable program, wherein the computer-readable program when executed on a computer causes the computer to determine an intermediate bitset based on a variable-bit component of the mask constraint; and generate the bitset constraint based on the intermediate bitset and on a fixed-bit component of the mask constraint.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
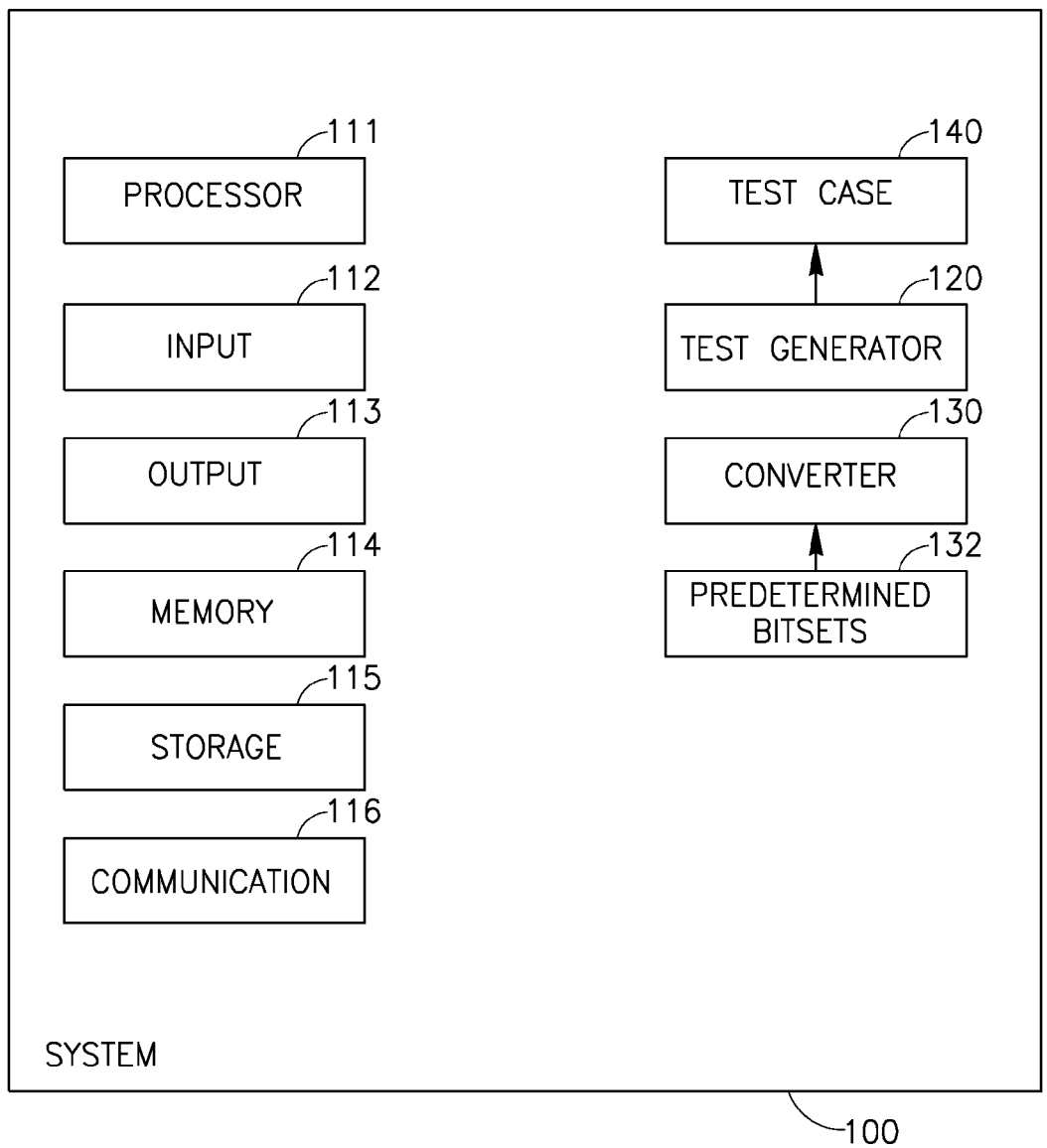
FIG. 1 is a schematic block diagram illustration of a computing system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

At an overview, some embodiments include devices, systems and/or methods of converting a mask constraint into a bitset constraint.

A mask constraint ("the mask") constraining a number, may refer to a binary representation of the number, e.g., the mask may refer to a string of M binary bits representing the number. The mask may constrain, for example, one or more of the M bits of the number to have specific values ("the fixed bits"); and maintain one or more other bits of the number unconstrained ("the variable bits"). For example, a mask "XXX1XX0X" may constrain a second Least-Significant-Bit (LSB) and a fifth LSB of the number to have the values "0" and "1", respectively, and maintain values of a first, third, fourth, sixth, seventh and eighth LSBs of the number unconstrained.

The mask, represented by an M-bit binary string, may be characterized, or represented by an ordered pair of binary strings of M bits, denoted (f,v), representing a fixed-bit component of the mask, and a variable bit component of the mask, respectively. The string f may include, or may be, for example, a binary string of M bits, having bits with the value "1" representing respective bits of the mask having a constrained value "1"; and having bits with the value "0" for substantially all other bits. The string v may include, or may be, for example, a binary string of M bits, having bits with the value "1" representing respective unconstrained bits of the mask, and having bits with the value "0" for substantially all other bits. For example, for M=9, the mask "XX1X01XX0" may be represented by a corresponding ordered pair of strings (f,v), wherein f=001001000, and v=110100110.

A bitset constraint, denoted B, may include, for example, an N-bit binary string representing the mask, wherein $N=2^M$. An i-th bit of a number X may be denoted X(i), wherein X(0) denotes the first least significant bit of the number X. A bit of Bitset B may have the value "1", for example, if and only if an index of the bit is equal to a decimal number satisfying the mask constraint; and may have the value "0" otherwise. For example, for M=4, the mask "1X0X" may be represented by a 16-bit binary string B=0011001100000000. The bits of the bitset B having the indices eight, nine, twelve and thirteen have a value "1", and other bits of B have a value "0", indicating that the decimal numbers eight, nine, twelve and thirteen as represented by their respective 4-bit binary strings, "1000", "1001", "1100", and "1101", respectively, satisfy the mask constraint.

In some embodiments, a method of converting a mask constraint into a bitset constraint may include determining an intermediate bitset based on a variable-bit component of the mask; and generating the bitset constraint based on the intermediate bitset and on a fixed-bit component of the mask.

In some embodiments, generating the bitset constraint may include left shifting the intermediate bitset by a number of bits equal to a numerical value of the fixed-bit component.

In some embodiments, determining the intermediate bitset may include assigning an initial value to the intermediate bitset, and iteratively modifying the intermediate bitset based on one or more non-zero bits of the variable-bit component. For example, the intermediate bitset may be modified based on a non-zero LSB of the variable-bit component, the resulting intermediate bitset may be modified based on a second non-zero LSB of the variable-bit component, the resulting intermediate bitset may be modified based on a third non-zero LSB of the variable-bit component, and so on, e.g., until iterating over substantially all non-zero bits of the variable-bit component.

In some embodiments, iteratively modifying the intermediate bitset may include determining a number based on the non-zero LSB of the variable-bit component, for example, determining the number to be two to the power of the index of the non-zero LSB, e.g., by applying a bitwise AND operator to the variable-bit component and a two-complementary representation of a negative of the variable-bit component; modifying the intermediate bitset based on the number, for example, by adding to the intermediate bitset a result of a left shift of the intermediate bitset by a number of bits equal to the determined number; modifying the variable-bit component based on the determined number, for example, by subtracting the determined number from the variable-bit component; and repeating the determining, the modifying of the intermediate bitset, and the modifying of the variable-bit component, for one or more other non-zero LSBs of the variable-bit component, e.g., until iterated over substantially every non-zero bit of the variable-bit component.

According to these embodiments, the mask constraint may be converted into the bitset constraint within a time period corresponding to a time complexity of no more than an order of n, wherein n denotes the number of non-zero bits of the variable-bit component of the mask, for example, with an order constant of less than ten; and/or utilizing a memory space corresponding to a space complexity of no more than an order of 1, e.g., with a relatively small order constant, for example, utilizing a constant memory space, e.g., of no more than ten N-bit words regardless of the value of M, assuming that the mask constraint is converted using a machine having an N-bit word-size, which processes an N-bit string as a single word.

In other embodiments, determining the intermediate bitset may include selecting the intermediate bitset from a plurality of predetermined bitsets corresponding to a plurality of respective possible masks, which in turn represent a respective plurality of possible variable-bit components.

According to these embodiments, the mask constraint may be converted into the bitset constraint within a time period corresponding to a time complexity of no more than an order of 1; and/or utilizing a memory space corresponding to a space complexity of no more than an order of N.

In some embodiments, the conversion of the mask constraint into the bitset constraint may be associated with, or may be implemented as part of a pseudo random test generator, which may be used for simulation based verification, and may be required to generate values for instruction opcodes, satisfying a plurality of user defined and/or architecture defined constraints, e.g., which may be represented by a mask constraint. Some embodiments may be applied in a context of post-silicon exercisers. In other embodiments the conversion of the mask constraint into the buitset constraint may be implemented as part of any other suitable method, device and/or system.

Reference is made to FIG. 1, which schematically illustrates a system 100 in accordance with some demonstrative embodiments.

In some demonstrative embodiments, system 100 may include, for example, a processor 111, an input unit 112, an output unit 113, a memory unit 114, a storage unit 115, and/or communication unit 116. System 100 optionally includes other suitable hardware components and/or software components.

In some demonstrative embodiments, processor 111 includes, for example, a central processing unit (CPU), a digital signal processor (DSP), a microprocessor, a host processor, a controller, a plurality of processors or controllers, a chip, a microchip, one or more circuits, circuitry, a logic unit, an integrated circuit (IC), an application-specific IC (ASIC), or any other suitable multi-purpose or specific processor or controller.

In some demonstrative embodiments, input unit 112 includes, for example, a keyboard, a keypad, a mouse, a touch-pad, a stylus, a microphone, or other suitable pointing device or input device. Output unit 113 include, for example, a cathode ray tube (CRT) monitor or display unit, a liquid crystal display (LCD) monitor or display unit, a screen, a monitor, a speaker, or other suitable display unit or output device.

In some demonstrative embodiments, memory unit 114 includes, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units. Storage unit 115 includes, for example, a hard disk drive, a floppy disk drive, a compact disk (CD) drive, a CD-ROM drive, a digital versatile disk (DVD) drive, or other suitable removable or non-removable storage units. Memory unit 114 and/or storage unit 115 may, for example, store data processed by system 100.

In some demonstrative embodiments, communication unit 116 includes, for example, a wired or wireless network interface card (NIC), a wired or wireless modem, a wired or wireless receiver and/or transmitter, a wired or wireless transmitter-receiver and/or transceiver, a radio frequency (RF) communication unit or transceiver, or other units able to transmit and/or receive signals, blocks, frames, transmission streams, packets, messages and/or data. Communication unit 116 may optionally include, or may optionally be associated with, for example, one or more antennas, e.g., a dipole antenna, a monopole antenna, an omni-directional antenna, an end fed antenna, a circularly polarized antenna, a microstrip antenna, a diversity antenna, or the like.

In some demonstrative embodiments, the components of system 100 are enclosed in, for example, a common housing, packaging, or the like, and are interconnected or operably associated using one or more wired or wireless links. In other embodiments, for example, components of system 100 may be distributed among multiple or separate devices, may be implemented using a client/server configuration or system, may communicate using remote access methods, or the like.

In some embodiments, system 100 may include a converter 130 to convert a mask constraint into a bitset constraint. In some embodiments, converter 130 may be included in, associated with, or implemented as part of a test generator 120, which is capable of generating pseudo random values used, for example, in a hardware verification process. In some embodiments, test generator 120 may generate at least one test case 140 including values for instruction opcodes, satisfying a plurality of user defined and/or architecture defined constraints, e.g., which may be represented by one or more mask constraints. In other embodiments, converter 130 may be implemented in any other suitable manner.

In some embodiments, converter 130 may convert a mask constraint, e.g., received from test generator 120, into a bitset constraint, e.g., as described below.

In some embodiments, converter 130 may be implemented by a computer-readable program, which may be stored by any suitable computer-useable medium, e.g., storage 115 and/or memory 114. The computer-readable program, when executed on a computer, e.g., processor 111, may cause the computer to convert the mask constraint into the bitset constrain, e.g., as described herein. In other embodiments, converter 130 may be implemented in any other suitable manner.

In some embodiments, the mask constraint may have at most M bits, and the bitset constraint generated by converter 130 may have at most $N=2^M$ bits. It may be assumed that one or more elements of system 100 processing the mask constraint, e.g., processor 111, may have an N-bit word-size. Accordingly, a bitset may be manipulated within a time complexity of an order of one ("O(1)"), and consume a storage space of the order of one.

In some embodiments, converter 130 may determine an intermediate bitset based on the variable-bit component v of the mask constraint; and determine the bitset constraint corresponding to the mask constraint based on the intermediate bitset and based on the fixed-bit component f of the mask constraint, e.g., as described in detail below with reference to FIG. 2.

In one embodiments, converter 130 may determine the intermediate bitset by converting the variable-bit component v into the intermediate bitset, e.g., as described below with reference to FIG. 3. According to this embodiment, the mask constraint may be converted into the bitset constraint within a time period corresponding to a time complexity of no more than an order of n, for example, with an order constant of less than ten; and/or utilizing a memory space corresponding to a space complexity of no more than an order of 1, e.g., with a relatively small order constant, for example, utilizing a constant memory space, e.g., of no more than ten N-bit words regardless of the value of N, assuming that the mask constraint is converted using a machine having a word-size of N bits.

In another embodiment, converter 130 may select the intermediate bitset from a plurality of predetermined intermediate bitsets 132 corresponding to a plurality of respective possible masks, which in turn represent a plurality of respective possible variable-bit components. For example, a bitset corresponding to every possible mask (0,v) resulting from every respective possible variable-bit component v, may be predetermined and stored, for example, in storage 115, e.g., in the form of a lookup table. The number of entries in the table may be $2^M$. According to this embodiment, the mask constraint may be converted into the bitset constraint within a time period corresponding to a time complexity of no more than an order of 1; and/or utilizing a memory space corresponding to a space complexity of no more than an order of $N=2^M$.

Figure 2:
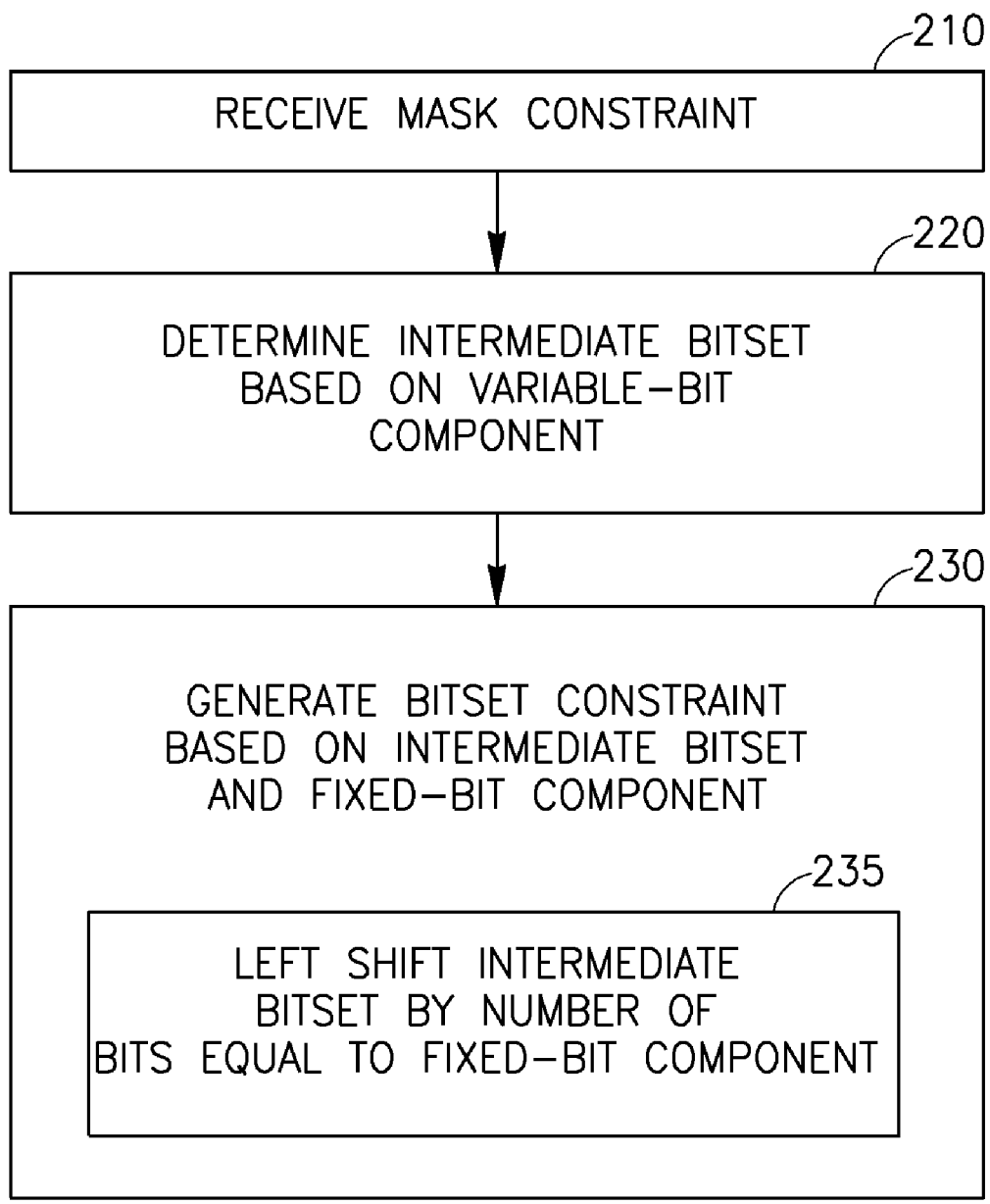
FIG. 2 is a schematic flow-chart illustration of a method of converting a mask constraint into a bitset constraint, in accordance with some demonstrative embodiments.

Reference is made to FIG. 2, which schematically illustrates a method of converting a mask constraint into a bitset constraint in accordance with some demonstrative embodiments. In some non-limiting embodiments, one or more operations of the method of FIG. 2 may be preformed, for example, by one or more elements of a system, e.g., system 100 (FIG. 1), for example, a converter, e.g., converter 130 (FIG. 1), and/or by other suitable units, devices and/or systems.

As indicated at block 210, the method may include receiving the mask constraint. For example, the mask constraint may be received from a test generator. The mask constraint may be pre-defined by a user and/or by other requirements, e.g., requirements associated with hardware-verification, e.g., as described above.

As indicated at block 220, the method may include determining an intermediate bitset, denoted bitset, representing the variable-bit component v of the mask constraint.

In one embodiment, determining the intermediate bitset may include determining the intermediate bitset by assigning an initial value to the intermediate bitset, and iteratively modifying the intermediate bitset based on non-zero bits of the variable-bit component, e.g., as described below with reference to FIG. 3.

In other embodiments, determining the intermediate bitset may include selecting the intermediate bitset from a plurality predetermined bitsets corresponding to a plurality of respective possible masks, which in turn represent a plurality of possible variable-bit components, respectively. For example, converter 130 (FIG. 1) may determine the intermediate bitset by selecting one of the plurality of predetermined bitsets 132 (FIG. 1) based on the variable-bit component of the mask constraint, e.g., by selecting from the plurality of predetermined bitsets 132 a bitset corresponding to the variable-bit component of the mask constraint.

As indicated at block 230, the method may include generating the bitset constraint based on the intermediate bitset and based on the fixed-bit component f of the mask constraint.

As indicated at block 235, generating the bitset constraint may include performing a left shift on the intermediate bitset by the value of the fixed bit component, e.g., by a number of bits equal to the decimal value of the fixed bit component f. For example, if the intermediate bitset is represented by the string "110011", and the fixed-bit component is represented by the string f=1000, which corresponds to the decimal value of $2^3=8$, then generating the bitset constraint B may include left shifting the intermediate bitset by eight bits, thereby to result in the bitset constraint B=11001100000000.

Figure 3:
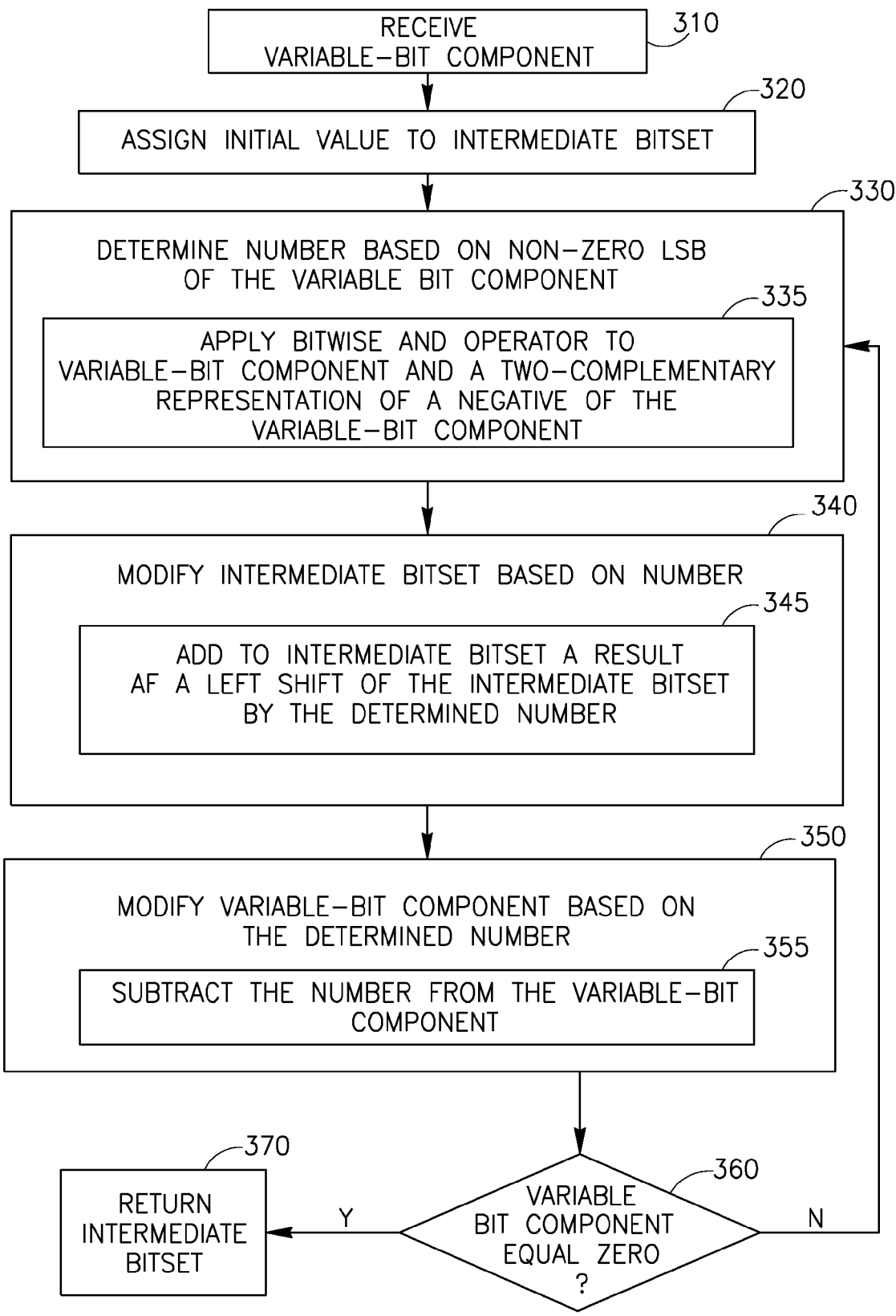
FIG. 3 is a schematic flow-chart illustration of a method of converting a variable-bit component of a mask constraint into an intermediate bitset, in accordance with some demonstrative embodiments.

Reference is made to FIG. 3, which schematically illustrates a method of converting a variable-bit component of a mask constraint into an intermediate bitset, in accordance with demonstrative embodiments. In some non-limiting embodiments, one or more operations of the method of FIG. 3 may be performed as part of a method of converting a mask constraint into a bitset constraint, e.g., the method of FIG. 2.

As indicated at block 310, the method may include receiving a string corresponding to the variable-bit component of the mask constraint, to be converted into the intermediate bitset.

As indicated at block 320, the method may include assigning an initial value to the intermediate bitset. For example, the value "1" may be assigned to the intermediate bitset, indicating that initially only the zero-indexed bit of the intermediate bitset has a non-zero value, e.g., thereby indicating that initially only the decimal value zero satisfies the intermediate bitset.

As indicated at block 330, the method may include determining a number based on a non-zero LSB of the variable-bit component v. The number may be determined, for example, to be equal to two to the power of an index, denoted i, of the non-zero LSB of variable-bit component. For example, a binary string representing the determined number may include an i-th bit having the value "1", and substantially all other bits having the value "0".

As indicated at block 335, determining the number may include applying a bitwise "AND" logical operator, also denoted "&", to the variable-bit component v and a two-complement representation of a negative of the variable-bit component v, e.g., by performing the logical operation "v&−v". In some embodiments, the method of FIG. 3 may be performed, for example, using an N word-size and utilizing two-complement arithmetic to represent, and to perform operations, involving negative integers. In such embodiments, for example, the determined number may be represented by the binary string resulting from the operation v&−v. The determined number resulting from this operation may include one bit corresponding to the non-zero LSB of v, having a value "1"; and other bits, e.g., substantially all other bits, having a value "0".

As indicated at block 340, the method may include modifying the intermediate bitset based on the determined number.

As indicated at block 345, modifying the intermediate bitset based on the determined number may include adding to the intermediate bitset a result of a left shift of the intermediate bitset by a number of bits equal to the number.

As indicated at block 350, the method may include modifying the variable-bit component based on the determined number.

As indicated at block 355, modifying the variable-bit component based on the determined number may include subtracting the determined number from the variable-bit component.

As indicated at block 360, the method may include determining whether or not there are any additional non-zero bits in the modified variable bit component, e.g., determining whether or not the modified variable bit component is equal to zero. The method may include repeating the determining of the number based on the modified variable-bit component, as indicated at block 330; modifying the intermediate bitset based on the determined number, as indicated at block 340; and modifying the variable-bit component based on the determined number, as indicated at block 350, e.g. until iterating over all non-zero bits of the variable-bit component.

As indicated at block 370, the method may include returning the intermediate bitset, e.g., if the modified variable-bit component is equal to zero.

In some embodiments, one or more operations of the methods of FIG. 2 and/or 3 may be implemented using any suitable computer readable program including a computer code, for example, written in a "C" computer language or any other suitable language. For example, one or more operations of the method of FIG. 2 may be implemented using one or more lines of the following code:

```
010 int mask2bitset(int v, int f)
011 {
012   int bitset=1;
013   while (v) {
014     int nextBit = v&-v;
015     bitset += bitset<<nextBit;
016     v-=nextBit;
017   }
018   return (bitset<<f);
019 }
020
```

For example, at line 010 the variable-bit component v and the fixed-bit component f representing the mask constraint may be received. Executing lines 012-017 may result in calculating the bitset corresponding to the mask (0,v). For example, executing line 012 may result in assigning the value "1" to the intermediate bitset. Executing line 014 may result in determining the number nextBit, by applying a bitwise "AND" logical operator to the variable-bit component v and a two-complement representation of a negative of the variable-bit component v. Executing line 015 may result in adding to the intermediate bitset the result of a left shift of the intermediate bitset by a number of bits equal to the number nextBit. Executing line 016 may result in subtracting the number nextBit from the variable bit component. Executing line 013 may result in iteratively repeating the execution of lines 014-016 over all non-zero bits of the variable-bit component. Executing line 018 may result in calculating the bitset corresponding to the mask (f,v) since, for example, i is legal for the mask (0,v) if and only if i+f is legal for the mask (f,v).

In some embodiments, a set, denoted, S(bitset,v), may be defined to include all the numbers x that can be presented as x=b+m, wherein b matches the bitset constraint and m matches the mask (0,v). Executing line 013 may maintain an invariant stating that the set S(bitset,v) corresponding to the modified variable-bit component may include all valid solutions to a mask (0,v'), wherein v' is the original value of v as received at line 011. For example, at a first execution of line 013, bitset=1, and the set S(bitset,v) includes all the solutions to the mask (0,v) with v equal to v', e.g., since only the value zero matches bitset=1. Thus a first part of the invariant is maintained. Executing line 014 may result in setting the number nextBit to the value v&−v, which represents the least-significant non-zero bit of v, wherein the component v is non-zero. Each iteration may maintain the set S(bitset,v) unchanged, e.g., since S(bitset,v)=S(bitset+bitset<<nextBit, v-nextBit). At a last iteration of Line 013, v=0, and the set S(bitset,v) includes all the solutions to the bitset constraint. Since the invariant still holds, it means we have fully converted the mask constraint into the bitset constraint.

In one example, the input at line 011 may be the mask (f=1000,v=0101). The component v may be initially set to v=0101, and the intermediate bitset may be set to bitset=1. Accordingly, the set S(bitset,v) may include the set of decimal values {0,1,4,5}. The number nextBit may be determined based on the value of v, e.g., nextBit=1. After a first iteration, the component v may be v=0100, the intermediate bitset may be bitset=11, the set S(bitset,v) may include the decimal values {0,1,4,5}, and the number nextBit may be determined to be nextBit=4. After a second iteration, the component v may be v=0000, the intermediate bitset may be bitset=110011, and the set S(bitset,v) may include the decimal values {0,1,4,5}. Since the component v may equal zero after the second iteration, the bitset constraint may be determined in Line 018 as bitset<<f=11001100000000, representing the four decimal values 8, 9, 12, and 13, which are identical to the four possible values according to the input mask constraint.

Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of converting a mask constraint into a bitset constraint, the method comprising:
    determining an intermediate bitset based on a variable-bit component of said mask constraint; and
    generating said bitset constraint based on said intermediate bitset and on a fixed-bit component of said mask constraint.

2. The method of claim 1, wherein determining said intermediate bitset comprises:
    assigning an initial value to said intermediate bitset;
    determining a number based on a non-zero Least Significant Bit (LSB) of said variable-bit component;
    modifying said intermediate bitset based on said number;
    modifying said variable-bit component based on said number; and
    repeating said determining, modifying said intermediate bitset, and modifying said variable-bit component, for one or more other non-zero LSBs of said variable-bit component.

3. The method of claim 2, wherein determining said number comprises applying a bitwise AND operator to said variable-bit component and a two-complementary representation of a negative of said variable-bit component.

4. The method of claim 2, wherein said number is equal to two to the power of an index of said non-zero LSB.

5. The method of claim 2, wherein modifying said intermediate bitset comprises adding to said intermediate bitset a result of a left shift of said intermediate bitset by a number of bits equal to said number.

6. The method of claim 2, wherein modifying said variable-bit component based on said number comprises subtracting said number from said variable-bit component.

7. The method of claim 1, wherein determining said intermediate bitset comprises selecting said intermediate bitset from a plurality of predefined bitsets based on said variable-bit component.

8. The method of claim 1, wherein generating said bitset constraint comprises performing on said intermediate bitset a left shift by a number of bits equal to said fixed-bit component.

9. An apparatus comprising:
    a converter to convert a mask constraint into a bitset constraint by determining an intermediate bitset based on a variable-bit component of said mask constraint; and generating said bitset constraint based on said intermediate bitset and on a fixed-bit component of said mask constraint.

10. The apparatus of claim 9, wherein said converter is to determine said intermediate bitset by assigning an initial value to said intermediate bitset; determining a number based on a non-zero Least Significant Bit (LSB) of said variable-bit component;

modifying said intermediate bitset based on said number; modifying said variable-bit component based on said number; and repeating said determining, modifying said intermediate bitset, and modifying said variable-bit component, for one or more other non-zero LSBs of said variable-bit component.

11. The apparatus of claim 10, wherein said converter is to determine said number by applying a bitwise AND operator to said variable-bit component and a two-complementary representation of a negative of said variable-bit component.

12. The apparatus of claim 10, wherein said number is equal to two to the power of an index of said non-zero LSB.

13. The apparatus of claim 10, wherein said converter is to modify said intermediate bitset by adding to said intermediate bitset a result of a left shift of said intermediate bitset by a number of bits equal to said number.

14. The apparatus of claim 10, wherein said converter is to modify said variable-bit component by subtracting said number from said variable-bit component.

15. The apparatus of claim 9, wherein said converter is to select said intermediate bitset from a plurality of predefined bitsets based on said variable-bit component.

16. The apparatus of claim 9, wherein said converter is to generate said bitset constraint by performing on said intermediate bitset a left shift by a number of bits equal to said fixed-bit component.

17. A computer program product comprising a non-transitory computer-useable medium including a computer-readable program, wherein the computer-readable program when executed on a computer causes the computer to:
determine an intermediate bitset based on a variable-bit component of a mask constraint; and
generate a bitset constraint based on said intermediate bitset and on a fixed-bit component of said mask constraint.

18. The computer program product of claim 17, wherein the computer-readable program causes the computer to determine said intermediate bitset by assigning an initial value to said intermediate bitset; determining a number based on a non-zero Least Significant Bit (LSB) of said variable-bit component; modifying said intermediate bitset based on said number; modifying said variable-bit component based on said number; and repeating said determining, modifying said intermediate bitset, and modifying said variable-bit component, for one or more other non-zero LSBs of said variable-bit component.

19. The computer program product of claim 17, wherein the computer-readable program causes the computer to select said intermediate bitset from a plurality of predefined bitsets based on said variable-bit component.

20. The computer program product of claim 17, wherein the computer-readable program causes the computer to generate said bitset constraint by performing on said intermediate bitset a left shift by a number of bits equal to said fixed-bit component.

* * * * *